(12) United States Patent
Andersson et al.

(10) Patent No.: US 12,065,042 B2
(45) Date of Patent: Aug. 20, 2024

(54) TOW BAR ARRANGEMENT FOR CONTROL OF A SELF-PROPELLED TRAILER

(71) Applicant: ELECTRO MOBILITY EUROPE AB, Spånga (SE)

(72) Inventors: Roland Andersson, Lidingö (SE); Anders Nordzell, Spånga (SE); Ludger Sommer, Bissendorf (DE)

(73) Assignee: Electro Mobility Europe AB, Spanga (SE)

( * ) Notice: Subject to any disclaimer, the term of this patent is extended or adjusted under 35 U.S.C. 154(b) by 205 days.

(21) Appl. No.: 17/793,838

(22) PCT Filed: Jan. 20, 2021

(86) PCT No.: PCT/SE2021/050031
§ 371 (c)(1),
(2) Date: Jul. 19, 2022

(87) PCT Pub. No.: WO2021/150160
PCT Pub. Date: Jul. 29, 2021

(65) Prior Publication Data
US 2023/0051354 A1 Feb. 16, 2023

(30) Foreign Application Priority Data
Jan. 21, 2020 (SE) .................................. 2050047-6

(51) Int. Cl.
*B60L 15/20* (2006.01)
*B60D 1/24* (2006.01)
(Continued)

(52) U.S. Cl.
CPC .......... *B60L 15/2009* (2013.01); *B60D 1/249* (2013.01); *B62D 59/04* (2013.01);
(Continued)

(58) Field of Classification Search
CPC ............ B60L 15/2009; B60L 2200/28; B60L 2240/12; B60L 2240/421; B60L 2240/423;
(Continued)

(56) References Cited

U.S. PATENT DOCUMENTS 10,343,703 B2   7/2019  Andersson
2002/0074764 A1*  6/2002  Allen ................... B62K 27/02
                                                280/204

(Continued)

FOREIGN PATENT DOCUMENTS

DE      10309621 A1    9/2004
DE   102010051838 A1   5/2012
(Continued)

OTHER PUBLICATIONS

International Search Report from corresponding International Application No. PCT/SE2021/050031, mailed on Mar. 16, 2021, 6 pages.
(Continued)

*Primary Examiner* — Kenneth J Malkowski
(74) *Attorney, Agent, or Firm* — Tucker Ellis LLP

(57) ABSTRACT

Tow bar arrangement (100) for interconnection of a pulling vehicle (10) and a pulled trailer (20). The arrangement (100) comprises a control device (110) with a force sensor (111) arranged to sense an instantaneous relative force between vehicle (10) and trailer (20). The control device (110) is arranged to produce a control signal for an electric motor (21) arranged to propel the trailer (20) so that a motor force counter-acts said measured force. The invention is characterised in that the control device (110) is arranged to a first time series of force measurements, in that the control device (110) comprises a low-pass filter (112) producing a second
(Continued)

low-pass filtered time series, and in that a regulator (113) is arranged to regulate said second time series to produce said control signal.

22 Claims, 5 Drawing Sheets

(51) Int. Cl.
*B62D 59/04* (2006.01)
*B62K 27/00* (2006.01)
*B62K 27/12* (2006.01)

(52) U.S. Cl.
CPC ............ *B62K 27/003* (2013.01); *B62K 27/12* (2013.01); *B60L 2200/28* (2013.01); *B60L 2240/12* (2013.01); *B60L 2240/421* (2013.01); *B60L 2240/423* (2013.01)

(58) Field of Classification Search
CPC ........ B60D 1/249; B62D 59/04; B62D 13/06; B62K 27/003; B62K 27/12; B60T 8/1708; B60T 7/20; B60T 2230/06; B60T 8/248; B60W 2050/0056; B60W 2300/14; B60Y 2200/147
See application file for complete search history.

(56) References Cited

U.S. PATENT DOCUMENTS

| | | |
|---|---|---|
| 2004/0050604 A1 | 3/2004 | Dube |
| 2008/0023234 A1 | 1/2008 | Wang |
| 2011/0042154 A1* | 2/2011 | Bartel ................. B60W 10/184 |
| | | 180/11 |
| 2012/0037435 A1 | 2/2012 | Duehring |
| 2012/0313345 A1* | 12/2012 | Kamler ................ B62K 27/003 |
| | | 280/292 |
| 2016/0031478 A1 | 2/2016 | Shiraki |
| 2017/0144497 A1* | 5/2017 | Guntersweiler ..... B62K 27/003 |
| 2017/0277150 A1 | 9/2017 | Nakamura |
| 2019/0118670 A1 | 4/2019 | Vallier |

FOREIGN PATENT DOCUMENTS

| | | |
|---|---|---|
| DE | 102011114337 A1 | 3/2013 |
| DE | 102017001742 A1 | 8/2018 |
| FR | 2966797 A1 | 5/2012 |
| SE | 1650459 A1 | 10/2017 |
| WO | 8604310 A1 | 7/1986 |
| WO | 2018172755 A1 | 9/2018 |

OTHER PUBLICATIONS

George Ellis, "Control System Design Guide, Chapter 9, Filters in Control Systems" vol. 4, dated 2012, 19 pages.

* cited by examiner

TOW BAR ARRANGEMENT FOR CONTROL OF A SELF-PROPELLED TRAILER

The present invention relates to a tow bar arrangement. In particular, the invention relates to a tow bar arrangement for use with an at least partly manually propelled vehicle, whereby the vehicle pulls a trailer using the tow bar.

It is well-known to arrange trailers of various types to be pulled by bicycles or other vehicles that are at least partly manually propelled by a user. For instance, trailers such as trailing carriages for children and various types of cargo are sold. Normally, such a trailer includes a tow bar arrangement for fastening the trailer to the vehicle so that the trailer can be pulled by the vehicle when the vehicle is propelled by the user.

More specifically, a parent can for instance connect a child trailer behind a bicycle using such a tow bar arrangement, such as connecting to the back hub of the bicycle and to a supporting structure of the trailer. The child can be placed in the trailer behind the bicycle so that the parent can bring the child along as the parent rides the bicycle.

Such trailers generally simplify logistical endeavours of users of bicycles and other manually or semi-manually propelled vehicles, by allowing larger amounts of cargo to be transported than what would otherwise be possible.

However, more cargo also means heavier load on the person propelling the vehicle. It would be desirable to be able to take more cargo without having to exert heavy pedalling force.

For instance, US 2019118670 A1, US 2012037435 A1 and US 2008023234 A1 show self-propelling, towed trailers.

It is also known to provide bicycles with an electric help motor for helping the propelling user.

However, even with such a bicycle it may be difficult to tow a heavy trailer under various conditions, such as going downhill, uphill, at different speeds and/or with more or heavy load.

Another problem is to allow relatively powerful and/or heavy trailers to be towed by a manually or semi-manually propelled vehicle, such as a bicycle with or without a helper motor. Trailers having a powerful motor and/or being heavy may be difficult to control when being towed by such vehicles.

Hence, it would be desirable to provide a safe yet simple, inexpensive and robust way to allow a user of a vehicle to safely and comfortably tow a trailer, even a heavy and/or powerful trailer, without having to exert excessive force in doing so. Such a solution should preferably be compatible with a wide variety of vehicles without requiring complicated calibration or configuration.

The present invention solves the above described problems.

Hence, the invention relates to a tow bar arrangement for interconnection of a vehicle and a trailer for pulling the trailer by the vehicle, wherein the tow bar arrangement comprises a control device in turn comprising a force sensor arranged to sense an instantaneous pulling or pushing force with respect to the vehicle in relation to the trailer, wherein the control device is arranged to measure said instantaneous force using said force sensor and to produce a control signal for an electric motor arranged to propel the trailer so that a force developed by said motor counter-acts said measured force, and is characterised in that the control device is arranged to measure said measured force to produce a first time series, of force measurement values, in that the control device comprises a low-pass filter arranged to filter said first time series to produce a second time series, of low-pass filtered force measurement values, and in that the control device furthermore comprises a regulator, arranged to regulate said second time series to produce said control signal.

In the following, the invention will be described in detail, with reference to exemplifying embodiments of the invention and to the enclosed drawings, wherein.

The Figures share the same reference numerals for same or corresponding parts.

Figure 1:
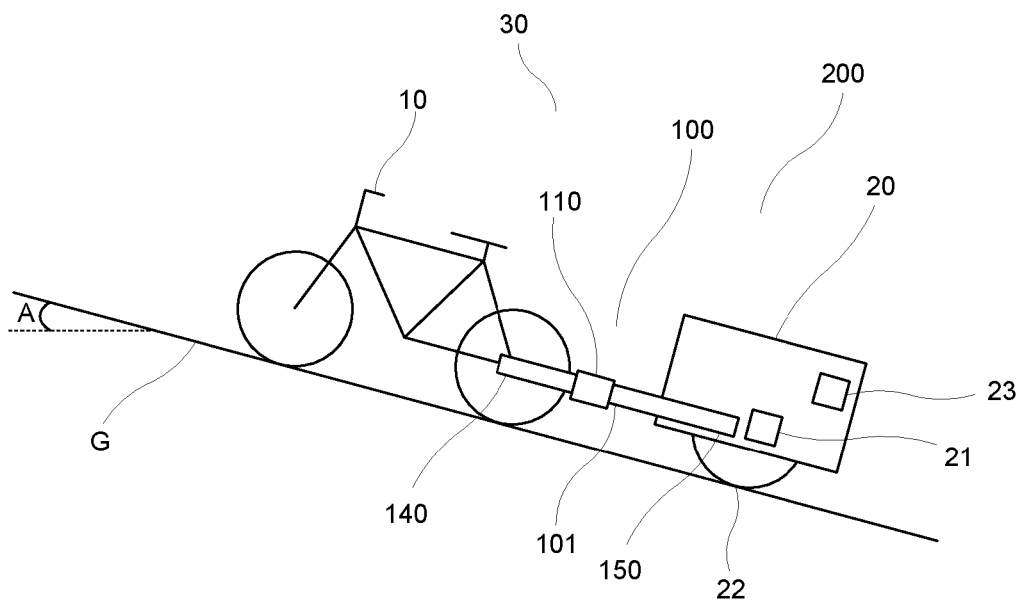
FIG. 1 shows a system including a towing vehicle, a towed trailer and a tow bar arrangement according to the present invention.

Hence, FIG. 1 shows a tow bar arrangement 100 for interconnection of a vehicle 10 and a trailer 20, and specifically for pulling the trailer 20 by the vehicle 10 when travelling on the ground G. The interconnection is a physical interconnection, achieved using a tow bar 101 of the tow bar arrangement 100, resulting in that the trailer 20 substantially follows movements of the vehicle 10 (it being understood that small movements between the vehicle 10 and the trailer 20 can occur and be absorbed by a suspension of the tow bar 100 or similar, see below).

The vehicle 10 can be any type of vehicle used by a person for transport. However, it is preferred that the vehicle 10 is a completely or partly manually propelled vehicle. That a vehicle is "manually propelled" means that a user uses muscle power to set the vehicle 10 in motion. The vehicle 10 may also comprise an internal motor, such as an electric helper motor. A vehicle 10 both being arranged for manual and motor-assisted propulsion is herein denoted "semi-manually propelled".

The vehicle 10 may hence be a bicycle with or without a helper motor. The vehicle 10 may furthermore be a moped or similar light-weight motorcycle. It is preferred that the vehicle 10 is a two-wheeled vehicle.

As will be discussed below, a tow bar arrangement 100 according to the present invention may also be useful for interconnecting several trailers 20 to form a trailer train 300, in which case one trailer 20 may be the "vehicle" of another trailer, being towed by the first trailer 20 via the tow bar arrangement 100.

The trailer 20 may be any suitable trailer, such as a bicycle trailer for transport of children and/or cargo. The trailer 20 may be a combined children's trailer and bicycle trailer, such as is well-known as such in the art.

The tow bar arrangement 100 may be a part of the trailer 20, or be separately provided, for instance to replace (retrofit) an existing tow bar provided with the trailer 20.

The tow bar arrangement 100 comprises a control device 110. The control device 110 performs control as will be discussed hereinbelow. This control mechanism may be implemented in purpose-built electronic hardware or a combination of general-purpose electronic hardware and a suitable specifically designed software function arranged to execute on said hardware, as the case may be. The control device 110 may comprise a battery and/or be powered from an external source, such as from a battery comprised in said vehicle 10 and/or said trailer 20. FIG. 1 illustrates a battery 23 of the trailer, for illustrative and exemplifying purposes.

In FIG. 1, the control device 110 is arranged on (along) the tow bar 101. However, it is realised that the control device 110 may be arranged in different locations, depending on the concrete application. For instance, the control device 110 may be arranged at or in a connection between the trailer 20 and the tow bar 101; at or in a connection between the vehicle 10 and the tow bar 101; or in any other suitable location. The control device 110 may also be distributed across more than one pieces of hardware.

The control device 110 is interconnected for communication with the trailer 20, and in particular with a motor 21 of the trailer 20, and with the below-described sensors. These communication interconnections may be wired and/or wireless, using suitable analogue and/or digital communication protocols as is well-known in the art as such.

Moreover, the control device 110 comprises a force sensor 111 (see FIG. 3), arranged to sense an instantaneous pulling or pushing force with respect to the vehicle 10 in relation to the trailer 20. Hence, when the vehicle 10 and the trailer are pressed together, such as because the vehicle 10 is braked during transport and/or the trailer 20 is propelled in an accelerating manner by its motor 21 to speeds above that of the vehicle 10, the sensed force is a "push" force; and when the vehicle 10 and the trailer are pulled apart, such as because the vehicle 10 is propelled by the user at speeds higher than that of the trailer 20 and/or the trailer 20 is braked during transport, the sensed force is a "pull" force.

That the force sensor 111 measures an "instantaneous" force means that the force measurement in question relates to a present force between the vehicle 10 and the trailer 20. Such measurement may be performed continuously or intermittently, preferably at least 5 times per second or even at least 10 times per second. Measurement values may be immediately pushed to the control device 110 upon reading, or be queried from the control device 110, such as at regular intervals.

The force sensor 111 may, by way of example, be a strain gauge sensor, an impedance force sensor, a HALL sensor or a magnetoelastic sensor.

Using this force sensor 111, the control device 110 is arranged to measure said instantaneous force and to produce a control signal U[t] for the electric motor 21 of the trailer. In other words, the control device 110 produces said control signal U[t] to control an electric power applied by the electric motor 21 to propel the trailer 20. This means that the control signal U[t] produced by the control device 110 indirectly controls a speed, or at least the above described force between the vehicle 10 and the trailer 20. It is preferred that the power applied by the motor 21 to the trailer 20 is arranged to be entirely controlled by the control device 110, via said control signal U[t], at least intermittently or in at least one control program (in particular the below-described second control program) implemented by the control device 110.

In generally, the control device 110 may be arranged to produce said control signal U[t] as a braking or electricity generation signal to the motor 21 in case the measured force is a pushing force.

In particular, the motor 21 is arranged to propel the trailer 20 so that a force developed by said motor 21 counteracts the above discussed measured force between the vehicle 10 and the trailer 20.

It may be so that the trailer 20 comprises its own control device for controlling the motor 21. When applying the present invention, the control device 110 at least partly, and preferably fully, replaces or supplements such an existing control device of the trailer 20, so as to implement the control according to the present invention. This may imply entirely bypassing such an existing control device, or providing a communication between the control device 110 and the existing control device so that the control device 110 at least partly controls the existing control device.

The tow bar arrangement 100 may also comprise the electric motor 21. For instance, the tow bar arrangement 100 may comprise, in addition to the tow bar 101 and the control device 110, also the motor 21 and possibly even one or several wheels 22 of the trailer 20. Then, one or several existing wheels of the trailer may be replaced (retrofitted) by corresponding electrically driven wheels, the motors of which are directly controlled by the control device 110 in a tow bar arrangement according to the present invention.

According to the invention, the control device 110 is arranged to measure said measured force between the vehicle 10 and the trailer 20 so as to produce a first time series, of force measurement values. Preferably, the first time series is a continuously updated series of force measurement values, with the last measurement value in said series being a last measured value. Hence, the first time series may be continuously updated by a most recently measured force value being added at an end of the series, possibly deleting one or several measurement values from the opposite end of the series, in other words a moving window type time series.

Further according to the invention, the control device 110 comprises a low-pass filter 112 (see FIG. 4*a*), arranged to filter the above mentioned first time series to produce a second time series, of low-pass filtered force measurement values. The second time series may be of the same vector size as the first time series and may be of a similar moving window constitution.

In addition to the low-pass filter 112, the control device 110 also comprises a regulator 113, arranged to regulate said second time series to produce said control signal U[t]. Expressed differently, the regulation performed by the regulator 113 produces the control signal U[t], which is then fed, directly or indirectly via circuitry in the trailer 20, to the motor 21. The motor 21 is power regulated using the control signal U[t], which is hence output from the regulator 113.

It is understood that the low-pass filter 112 and the regulator 113 may be implemented using any suitable technology, such as suitable purpose-designed hardware, purpose-designed software executing on general-purpose hardware; or a combination of these. Preferably, all functionality of the control device 110 is implemented in the digital domain, using digital signal processing so as to achieve said control signal U[t].

The low-pass filter 112 may receive, as a feedback signal based upon which the regulation in the regulator 113 takes place, a currently/recently measured value of the above described force F[t−1] between the vehicle 10 and the trailer 20, and said control signal U[t] may be produced so as to regulate this force F[t−1] to a desired force value. Such a desired force value may be predetermined or in turn depend on one or several variable parameters, such as a current trailer 20 inclination, a current velocity and so forth. Examples with be provided below.

Figure 4A:
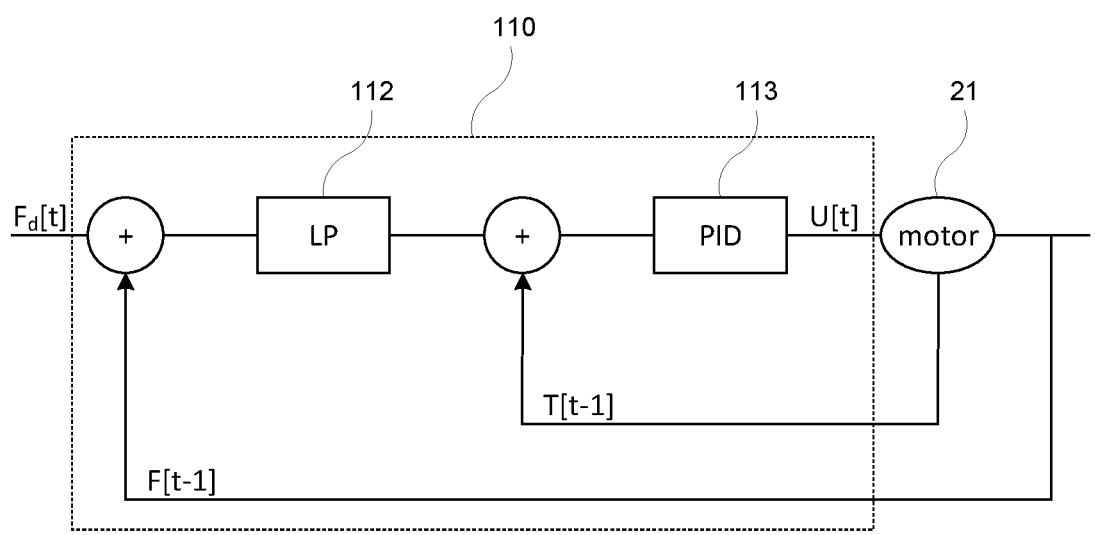
FIG. 4a shows a first control loop useful in the present invention.

Hence, FIG. 4a illustrates an exemplary control loop useful in a tow bar arrangement 100 according to the present invention, in which t denotes time and t−1 denotes the time one sample period prior to the time t. F[t] denotes force at time t; $F_d$[t] denotes, at time t, the desired force to which the control loop is arranged to control the relative force between the vehicle 10 and the trailer 20. This desired force may be static or dependent on circumstances, such as current velocity and/or inclination of the vehicle 10 and/or trailer 20. T[t] denotes motor torque at time t. U[t] is the control signal, at time t, implying a corresponding torque applied by the motor 21 onto a wheel axis of a trailer 20 wheel 22.

As can be seen from FIG. 4a, the low-pass filter 112 performs a filtering of a force signal being calculated (such as by a sum function) based on said desired value $F_d$[t] and further based on said measured relative force F[t−1] between the vehicle 10 and the trailer 20. The output of the low-pass filter 112 is used to calculate a desired motor torque value, which in turn is used, in combination with a measured torque value T[t−1] output from a suitable sensor in the motor 21, such as using a sum function, in turn being fed into the regulator 113. The torque required may be represented by a gain value that is set to the motor 21. In practise, the regulation of the desired motor torque value can be achieved based on a priori knowledge of a known relationship (such as a linear relationship) between input current and produced torque, which relationship is a characteristic of the motor used. The current may be supplied by setting a corresponding voltage. Hence, for the regulation in terms of a desired torque value is equivalent to a regulation in terms of a supplied current or even an applied voltage, via known motor-specific relationships. In typical motors, the current input may be 0-20 A, and the achieved torque may be 0-15 Nm peak; 0-8 Nm average.

Hence, the regulator 113 may be arranged as a part of an inner control loop, while the low-pass filter 112 may be arranged as a part of an outer control loop. The final control signal value U[t] is regulated to be a control signal value controlling the motor 21 to apply a dynamically changing power with the aim of achieving the desired relative force $F_d$.

The present inventors have discovered that such a setup, with a low-pass filter 112 in combination with a regulator 113 for controlling the motor 21, results in greatly improved user comfort. In particular, such a basic setup in combination with one or several of the various specific implementation aspects described herein, depending on application, makes it possible for a user to handle even very powerful and/or heavy trailers 20 without increasing the risk of accidents.

In a particularly preferred embodiment, the control device 110 is arranged to produce said control signal U[t] so that the trailer 20 does not push the vehicle 10, preferably so that the trailer 20 will never push the vehicle 10 irrespective of operating prerequisites as long as the trailer 20 has the capacity of braking enough (see below).

Put differently, the control signal U[t] may be produced to always achieve a "pulling" force between the vehicle 10 and the trailer 20. This pulling force, which is effectively controlled using the control signal U[t] produced by the control device 110, is preferably small, such as maximally 20%, such as maximally 10% or even maximally 5%, of a force currently provided onto the trailer 20 by the motor 21 via a torque applied by the motor 21 to the wheel 22 of the trailer 20.

In particular, the control device 110 may be arranged to produce said control signal U[t] so that the motor 21 counteracts the measured force, between the vehicle 10 and the trailer 20, to at least 80%, or even at least 90% or even 95%, and at the most 100%, or preferably at the most 98%.

This counteraction is then provided as long as the motor 21 is capable of producing sufficient instantaneous power, since it is possible that the user on the vehicle 10 is able to produce an instantaneous power which is significantly higher than the maximum power output of the motor 21. In the latter case, the motor 21 will typically run at full power to counteract the measured force between the vehicle 10 and the trailer 20 to as large a degree as possible.

As mentioned above, in case the vehicle 10 is braked the control device 110 may be arranged to activate a braking function of the trailer 20 with the aim of maintaining a non-pushing function of the trailer 20. Such braking function may be a part of a control loop such as the one shown in FIG. 4a, or be implemented using a separate control loop in the control device 110. For braking, an internal electricity generating function of the motor 21 may be used (in which case the generated electrical power may be fed to the trolley 20 battery 23), and/or the trolley 20 may be arranged with a separate brake activatable directly or indirectly (such as via the motor 21) from the control device 110.

It is realized that such regulation will regulate the force between the vehicle 10 and the trailer 20 to a value being close to zero but being a small pulling force, as long as the motor 21 (and or brake) is capable of producing sufficient power. The desired pulling force that the regulator 113 is arranged to use as its target value may be at least 5 N, such as at least 10 N. The desired pulling force may also be at the most 50 N, such as at the most 30 N.

This will provide a user experience with a small but not considerable effort increase when towing the trailer 20, as compared to when not towing the trailer 20, in a way which is substantially independent of a weight of the trolley 20 and also of if the vehicle 10 travels uphill or downhill. However, since the trailer 20 at no time pushes the vehicle 10, even a heavy and/or powerful trailer will not jeopardise traffic security.

In order to offer adequate propulsion help when travelling on non-horizontal ground G surfaces (see FIG. 1), in particular when the force is regulated to be a small pulling force as described above, the control device 110 may further comprise a velocity sensor 115 and a trailer inclination sensor 114.

Figure 3:
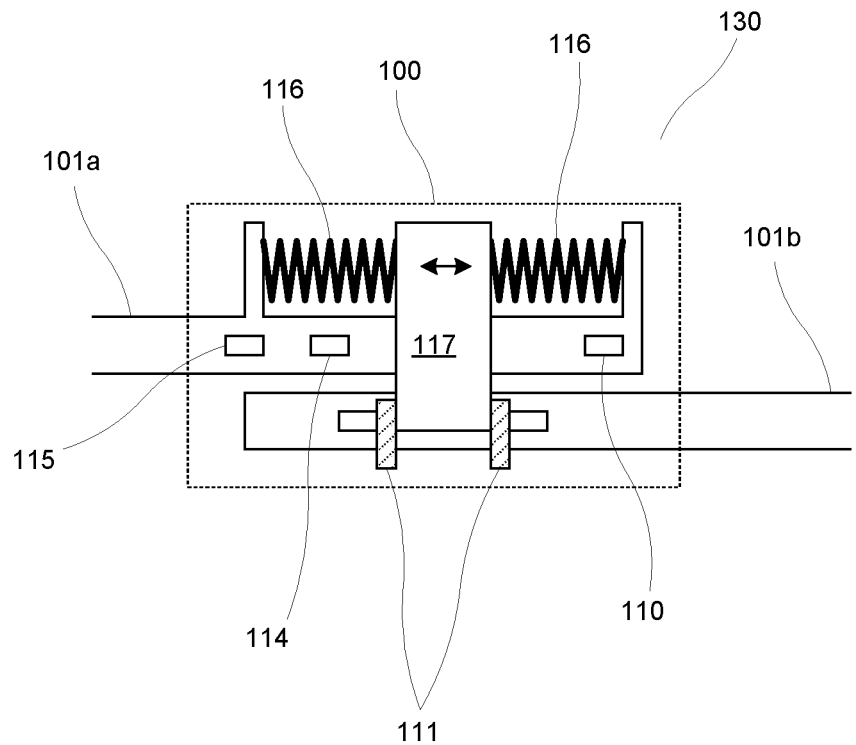
FIG. 3 is a detail view of a tow bar arrangement according to the present invention.

Namely, FIG. 3 illustrates an exemplifying tow bar arrangement 100 arranged between two parts 101a, 101b of the tow bar 101. Hence, the two bar 101 comprises two parts 101a, 101b being movable in relation to each other in a main movement direction of the vehicle 10 and the trailer 20, where a first such part 101a is arranged to be connected to the vehicle 10 while a second such part 101b is arranged to be connected to the trailer 20.

The tow bar arrangement 100 may comprise a resilient suspension 130, arranged to absorb small horizontal movements of the trailer 20 in relation to the interconnected vehicle 10. The resilient suspension 130, in turn, may be spring-loaded both in a forward and a backward direction of the trailer 20 in relation to the vehicle 10. In particular as illustrated in FIG. 3, the resilient suspension 130 may comprise spring means 116, such as comprising a pair of compression springs, such as a pair of metal coil springs, said compression springs being arranged on and supported by said first tow bar part 101a, and said compression springs further being arranged on either side of a part 117 rigidly moving with said second tow bar part 101b.

The above described force sensor 111 may then be arranged as a tension or compression sensor at said suspension 130, and in particular at the suspension of said part 117 in relation to said second tow bar part 101b. in FIG. 3, the force sensor 111 is provided as a pair of pressure-sensitive pieces of material, one on either side of the part 117 and arranged to sense a relative instantaneous force, in a main travel direction of the vehicle 10 and the trailer 20, applied between the first 101a and second 101b tow bar parts.

FIG. 3 also discloses that the tow bar arrangement 100 comprises the velocity sensor 115. In general, the velocity sensor 115 may be arranged to measure both an absolute velocity of the tow bar arrangement 100 and a relative velocity between the vehicle 10 and the trailer 20. This may be achieved by the use of two sensors, one rigidly connected to the vehicle 10 and one rigidly connected to the trailer 20. There may also be a separate sensor measuring a relative velocity difference between the vehicle 10 and the trailer 20, in which case only one additional sensor is needed in order to measure an absolute velocity. In FIG. 3, only one velocity sensor 115 is displayed, for reasons of simplicity.

FIG. 3 also shows said trailer inclination sensor 114, arranged to measure an instantaneous inclination A (FIG. 1) of the trailer 20 in relation to the horizontal, and hence substantially a ground G inclination A in relation to the horizontal.

It is realized that the control device 110 is in communication with all sensors described herein for reading of read measurement values, as described above.

The control device 110 may hence be arranged to measure, using said velocity sensor 115, an instantaneous absolute velocity of the trailer 20 and/or of the vehicle 10. Furthermore, the control device 110 may be arranged to measure, using said trailer inclination sensor 114, an instantaneous inclination A of the trailer 20 in relation to the horizontal.

In this and other cases, the control device 110 may be arranged with at least two different control programs. As the term is used herein, "control program" means a set of control parameters or functions defining a distinct type of control of the motor 21 provided input from various connected sensors.

In particular, the control device 110 may be arranged to produce said control signal U[t] according to a first such control program in case said measured instantaneous velocity is non-zero and below a predetermined velocity threshold value, and said measured instantaneous inclination A in relation to the horizontal is simultaneously above a predetermined inclination threshold value.

The predetermined velocity threshold value may be at least 3 km/h and at the most 10 km/h, preferably 5-7 km/h, such as around 6 km/h. The predetermined inclination threshold value may be at least 1% and at the most 10%, such as between 2-5%, such as around 3%.

In the opposite case, that is in case said measured instantaneous velocity is not below said predetermined velocity threshold value or said measured instantaneous inclination A in relation to the horizontal is not above said predetermined inclination threshold value, the control device 110 may instead be arranged to produce said control signal U[t] according to a second or further control program. Whether the second control program is selected, or a further available control program, such as a third or fourth available control program, when the first control program is not selected, may be determined based on certain parameters that can be read or determined by the control device 110. Such parameters may include one or several of the measured inclination A; the measured velocity; a measured acceleration of the vehicle 10 and/or the trailer 20; a current weight of the trailer 20; and user-set or predetermined threshold values for one or several of these parameters.

Said first control program may be defined so that, when the control device 110, when being operated in the first control program, is arranged to produce said control signal U[t] so that the motor 21 is operated either at a predetermined power or at a power which is dependent on said measured instantaneous inclination A in relation to the horizontal. One option is to use a control loop designed so that, the larger the inclination A, the larger the power of the motor 21. Alternatively, a predetermined fixed power, such as a maximum available motor 21 power, may be used irrespectively of the inclination A as long as the first control program is used.

Furthermore, the first control program may be defined so that, when the control device 110 is operated in said first control program, it is arranged not to apply the above mentioned low-pass filter 112. However, the second control program, and possibly also any further control program mentioned above, is then defined so that, when the control device 110 is operated in that control program, it is arranged to apply said low-pass filter 112.

Preferably, the first control program uses both the low-pass filter 112 and the regulator 113 in some or all the ways illustrated in FIG. 4a and as described in connection to that FIG. 4a.

Figure 4B:
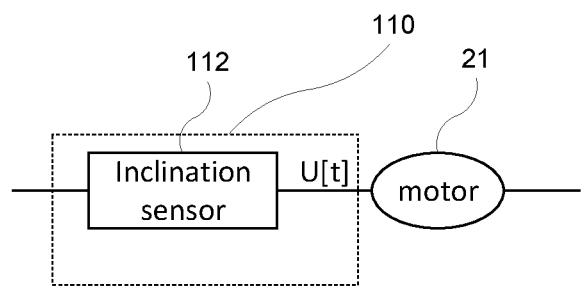
FIG. 4b shows a second control loop useful in the present invention.

In contrast, FIG. 4b illustrates an example of a control loop which the control device 110 can use to produce the control signal U[t] when being operated in said first control program. An inclination value A currently measured by the inclination sensor 112 is used to calculate the control signal U[t] which is fed to the motor 21 so as to achieve a desired torque tot eh trailer 20 wheel 22.

Using such first and second (and possibly further) control programs, a user of the vehicle can get adequate help to start under uphill conditions without jeopardising security once having started.

In order to avoid false positive readings, the control device 110, while in said second or further control program, may be arranged not to activate said first control program until said measured instantaneous velocity has been measured to be non-zero and below said predetermined velocity and said measured instantaneous inclination A in relation to the horizontal has simultaneously been measured to be above said predetermined inclination across the entire completion of a predetermined trailer 20 rolling distance and/or a predetermined trailer 20 wheel 22 rolling angle. In other words, even if the criteria for activating the first control program are met, the first control program is nevertheless not implemented before the criteria in question have been met for a certain time period. This time period can be measured in terms of trailer 20 rolling distance and/or trailer 20 wheel 22 rolling angle. This distance or angle may be measured using any suitable sensor, such as the velocity sensor 115 or a wheel 22 motor 21 angle sensor (such as the one described below).

In addition, the control device 110, while in said second or further control program, may also be arranged not to activate said first control program if said predetermined trailer 20 rolling distance or predetermined trailer 20 wheel rolling angle takes more than a predetermined amount of time to be achieved. This predetermined maximum time may be measured using a clock of the control device 110 from a point in time when the first control program criteria were first met.

In addition, the control device 110, while in said second or further control program, may also be arranged not to activate said first control program in case a currently measured velocity change of the vehicle 10 and/or the trailer 20 indicates that the two are currently decelerating from a velocity above said predetermined velocity to a velocity below said predetermined velocity, or a currently measured pushing relative force, since this would imply that the user is trying to come to a stop, which could happen in an uphill slope.

At any rate, in order to allow the user to brake efficiently and securely, the control device 110, while in said first control program, may also be arranged to immediately activate said second or further control program (and hence inactivate the first control program) in case a decrease of said measured relative force between the vehicle 10 and the trailer 20 is detected, which decrease exceeds a predetermined threshold value or which decrease is to at least a predetermined pushing relative force between the vehicle 10 and the trailer 20.

As explained above in connection to FIG. 4a, the control signal U[t] may be arranged to, directly or indirectly, control a torque applied by said electric motor 21, as opposed to a speed of the motor 21 or of the trailer 20. It is understood that such a torque indirectly affects such a speed, but what is meant here is that the control loop of the control device 110 does not calculate or directly regulates such a speed but instead such a torque.

In addition to the force F[t−1] and torque T[t−1] feedback loops shown in FIG. 4a, the control loop used in said first control program may use additional feedback loops or control mechanisms.

For instance, the control device 110 may be arranged to receive a measured instantaneous speed of the motor 21 and/or of the trailer 20, and to feed this value into the regulator 113 as an input value affecting the determined control signal U[t]. For instance, the regulator 113 may implement a maximum speed of the vehicle 10 and/or of the trailer 20; or the regulator 113 may use a relative velocity difference between the vehicle 10 and the trailer 20 to calculate a vibration pattern between the two and use that information when calculating the control signal U[t] so as to counter such vibration pattern (active dampening).

In another example, a measured electric current value, representing an electric current being fed to the motor 21, may be monitored and the regulator 113 may cap the electric current, via the control signal U[t] at a predetermined electric current value so as not to damage the motor 21, such as by overheating.

In general, the regulator 113 may a PI regulator or a PID regulator, the general properties of which regulator types are well-known per se in the art.

Turning to the low-pass filter 112, this may have properties that filter out self-oscillating frequencies of the towing system 30 and non-wanted high frequencies. In particular, the low-pass filter 112 may be designed with a cut-off frequency $\omega_c$ close to a horizontal resonance frequency $\omega_{osc}$ of a system 30 comprising the towed trailer or trailers 20, the tow bar arrangement 100 itself and an interconnected towing vehicle 10, or a main such horizontal resonance frequency $\omega_{osc}$. This resonance frequency $\omega_{osc}$ is easily measured for different such systems for which the tow bar arrangement 100 is intended to be used.

That the cut-off frequency $\omega_c$ is "close to" such a horizontal resonance frequency $\omega_{osc}$ means, herein, that the cut-off frequency $\omega_c$ is selected so that the low-pass filter 112 is arranged to substantially filter out said resonance frequency $\omega_{osc}$ and higher frequencies, but substantially not to filter out lower frequencies. For instance, the cut-off frequency $\omega_c$ may be selected to be between 25% and 75% of said resonance frequency $\omega_{osc}$, or between 40% and 60% of said resonance frequency $\omega_{osc}$. Using such a low-pass filter 112 in combination with a regulator 113 as described above will generally provide for a smooth towing operation.

Ideally, the frequency response of the low-pass filter 112 is:

$$H_d(\omega) = \begin{cases} 1 & |\omega| < \omega_c \\ 0 & \text{else} \end{cases}$$

Implementing such an ideal filter, however, is not practical given the restricted hardware and software resources possible to build into a tow bar system 100 such as the present one. Therefore, the present inventors have identified a number of implementation details providing well-balanced compromises between computing resources, signal stability and ultimately towing performance under varying conditions. In particular, one object is to minimize ripple both in the passband and the stop band of the low-pass filter 112.

A number of such advantageous implementation details will be described in the following.

Hence, the low-pass filter 112 may be designed as a FIR (Finite Impulse Response) filter. Such an (ideal, continuous) filter may be represented in the time domain as $$h_d[n] = \frac{1}{2\pi}\int_{-\omega_c}^{\omega_c} e^{j\omega n}d\omega = \frac{\sin(n\omega_c)}{n\pi}.$$

Figure 5:
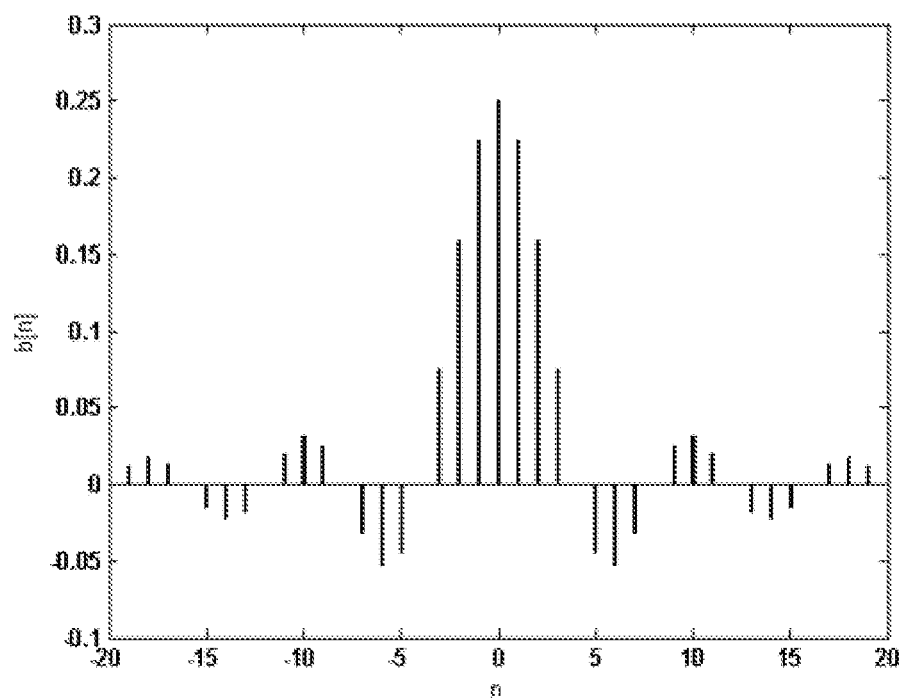
FIG. 5 shows the impulse response of a discrete low pass filter.

FIG. 5 shows the impulse response of a corresponding discrete filter. It is noted that in practical applications, implemented using digitally operating hardware/software, the low-pass filter 112 will be implemented as a discrete defined filter.

As we want to suppress the resonance frequency $\omega_{osc}$ and all higher frequencies, a sample rate for the above-mentioned relative force F[t−1] is selected as more than 2 times $\omega_{osc}$ (to satisfy the Nyquist sampling criterion). Preferably, the relative force is furthermore oversampled to a certain extent. This oversampling should at the same time not be too large, since this has been found to result in that the filter characteristics of the low-pass filter 112 deteriorate.

If $\omega_N=\omega_s/2$ is the Nyquist frequency ($\omega_s$ being the sampling frequency used), the present inventors have found the following relations to provide a well-balanced low-pass filter 112:

$\omega_N >= \omega_{osc}*3\text{(oversample)}$ $\omega_c < \omega_{osc} < \omega_N$ $\omega_c/\omega_N < 0.5,\text{preferably} < 0.1$ In general, said relative force may be measured at a sampling frequency $\omega_s$ of at least five times said horizontal resonance frequency $\omega_{osc}$ of said system 30.

In practical tests with systems 30 comprising a bicycle as vehicle 10 and a bicycle trailer 20, it has been found that a cut-off frequency $\omega_c$ of at least 0.2 Hz, such as at least 0.4 Hz; and at the most 1.5 Hz, such as at the most 1.0 Hz yields good results.

In practical applications, in which the low-pass filter 112 is implemented in digital electronics hardware/software, computation resources are limited and the impulse response of the low-pass filter 112 may be truncated to meet these limitations. In general, the low-pass filter 112 may truncated to use at least 10 and at the most 200, such as at the most 100 or even 60, samples and/or between 1-10 s, such as between 2-6 s of historic force measurement data.

Figure 6:
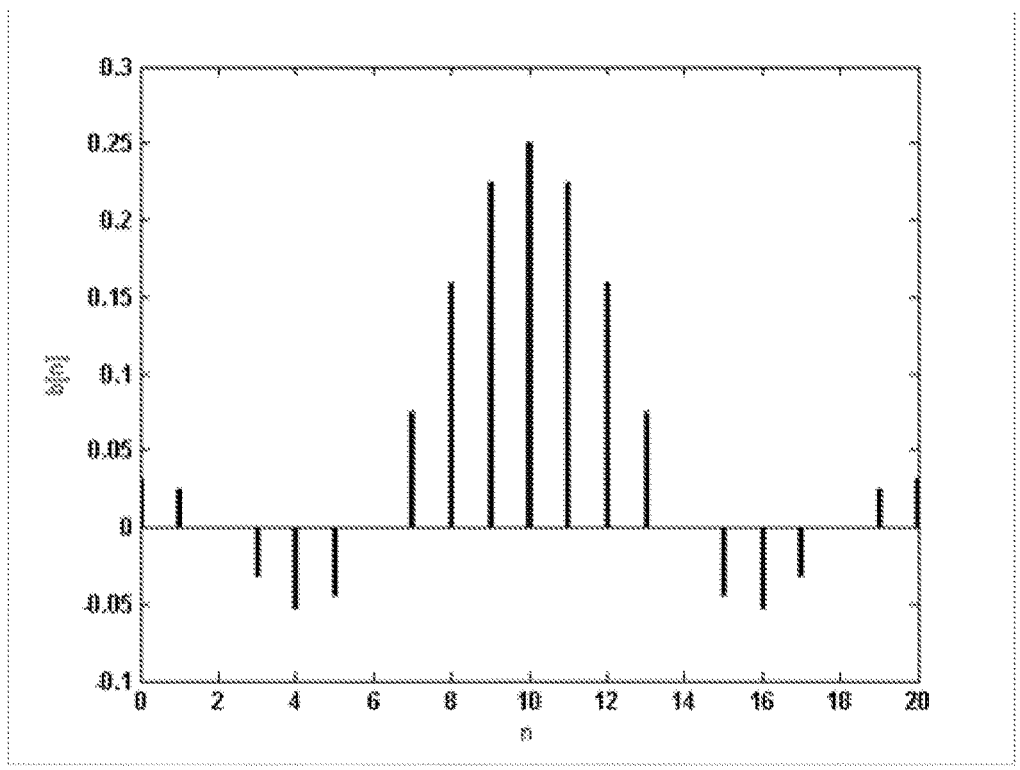
FIG. 6 shows the impulse response of a truncated and time-shifted discrete low pass filter.

FIG. 6 illustrates the impulse response for such a FIR filter which has been truncated to 21 consecutive samples.

The filter characterised in FIG. 6 is, however, not causal. In order to make the low-pass filter 112 causal, it may be time shifted at least 50% of the total (time) length of a used truncation. For instance, if the truncation is 21 samples, the time shift may be at least 11 samples. The trade-off here is that a truncation in combination with a time-shift of such a discretely defined low-pass filter will introduce a filter delay. The present inventors have discovered that using a time shift of at least 50% of the total truncation length provides an adequate compromise for a low-pass filter 112 used in the present application, together with a PI or PID regulator for controlling a motor on a towed trailer 20. In particular, this compromise provides for a stable control loop and also low-pass filter 112 characteristics being sufficiently close to a corresponding ideal filter.

Figure 7:
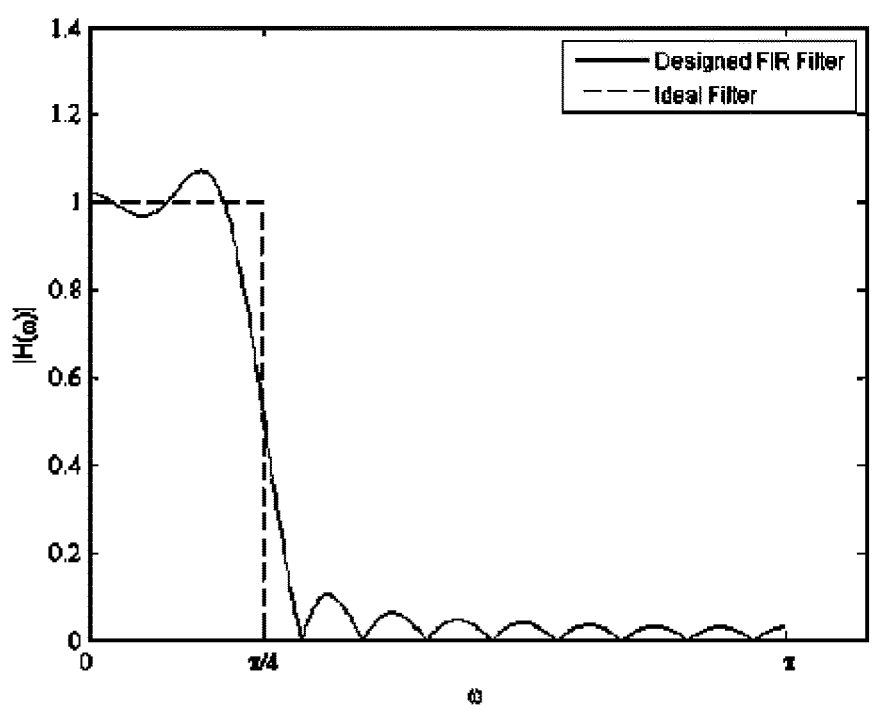
FIG. 7 shows a filter bandform diagram showing a filter useful in the present invention, as compared to an ideal filter.

A comparison between such an ideal filter (broken lines) and a discrete FIR low-pass filter 112 designed in accordance with the above principles (full lines) is illustrated in FIG. 7.

Hence, the control device 110 operated in said second control program, which may its default control program, is arranged to control the trailer 20 to, at all times whenever possible due to any motor 21 constraints, propel the trailer 20 so that it barely pulls the vehicle 10 in a direction opposite to a current movement direction of the vehicle 10. In other words, the relative force between vehicle 10 and trailer 20 is controlled, by the control device 110, to be the desired force—a force being close to zero but slightly negative (a slight pulling force).

As is illustrated in FIG. 1, the present tow bar arrangement 100 may comprise a hub connection 140 arranged to be releasably fastened to the back hub of a bicycle. Such hub connections are known as such, and may for instance be of a quick-release type, or comprise a hub axis arranged to replace an existing hub axis of a bicycle to be used as the towing vehicle 10 according to the present invention.

Similarly, the tow bar arrangement 100 may comprise a trailer connection 150, arranged to be releasably fastened to a supporting structure of the trailer 20. Such a trailer connection 150 may be designed in any suitable manner, the important thing being that the tow bar arrangement 100 may in itself constitute a standalone device attachable to any compatible vehicle 10 and/or any compatible trailer 20 for interconnection of a vehicle 10 to a trailer 20, or the tow bar arrangement 100 may be a fixedly integrated part of a trailer 20 arranged to be interconnected to any compatible vehicle 10.

In fact, the present invention also relates to a trailer arrangement 200 comprising a tow bar arrangement 100 according to the present invention and also to a trailer 20. Then, the tow bar arrangement 100, and in particular to tow bar 101, may be an integrated part of the trailer 20, and even permanently attached to the trailer 20.

Moreover in this case, the trailer 20 may in turn comprise the electric motor 21 arranged to propel the trailer 20, and also the battery 23 arranged to power the electric motor 21.

In particular in this case, the trailer arrangement 200 may be arranged to be connected, by said tow bar arrangement 100, to a second trailer arrangement 201 of the same type (see FIG. 2), forming a train 300 of trailer arrangements 200, 201 interconnected by said tow bar arrangement 100.

In such a trailer arrangement 200, 201, the trailer arrangement 200, 201 in question may be arranged to control its respective electric motor 21 based on said control signal as described above, so that the electric motor 21 in question exerts a force which instantaneously counteracts the measured relative force between the trailer arrangement 200, 201 and its towing vehicle. For the trailer arrangement 200, the relative force is measured between the vehicle 10 and the trailer arrangement's 200 trailer 20; while for the trailer arrangement 201 in the example shown in FIG. 2, the relative force is measured between the trailer 20 of the trailer arrangement 200 and the trailer 20 of the trailer arrangement 201. This way, smooth and safe towing can be performed by one vehicle 10 of two or more trailer arrangements 200, 201 that are connected one after the other in a train 300 of such trailer arrangements 200, 201.

It is understood that the trailer 20 and the tow bar arrangement 100 may be arranged as described above.

In a particularly preferred embodiment, the electric motor 21 is of a type in which the stator 2 comprises a number of stator 2 poles 7 which is not an integer multiple of a corresponding number of rotor 3 poles 7 and in which the stator 2 poles 7 are subdivided into at least three magnetically and electrically identical subsets 8 that are mounted one after the other around the angular direction of the electric motor 21. This is detailed in the following.

Figure 8:
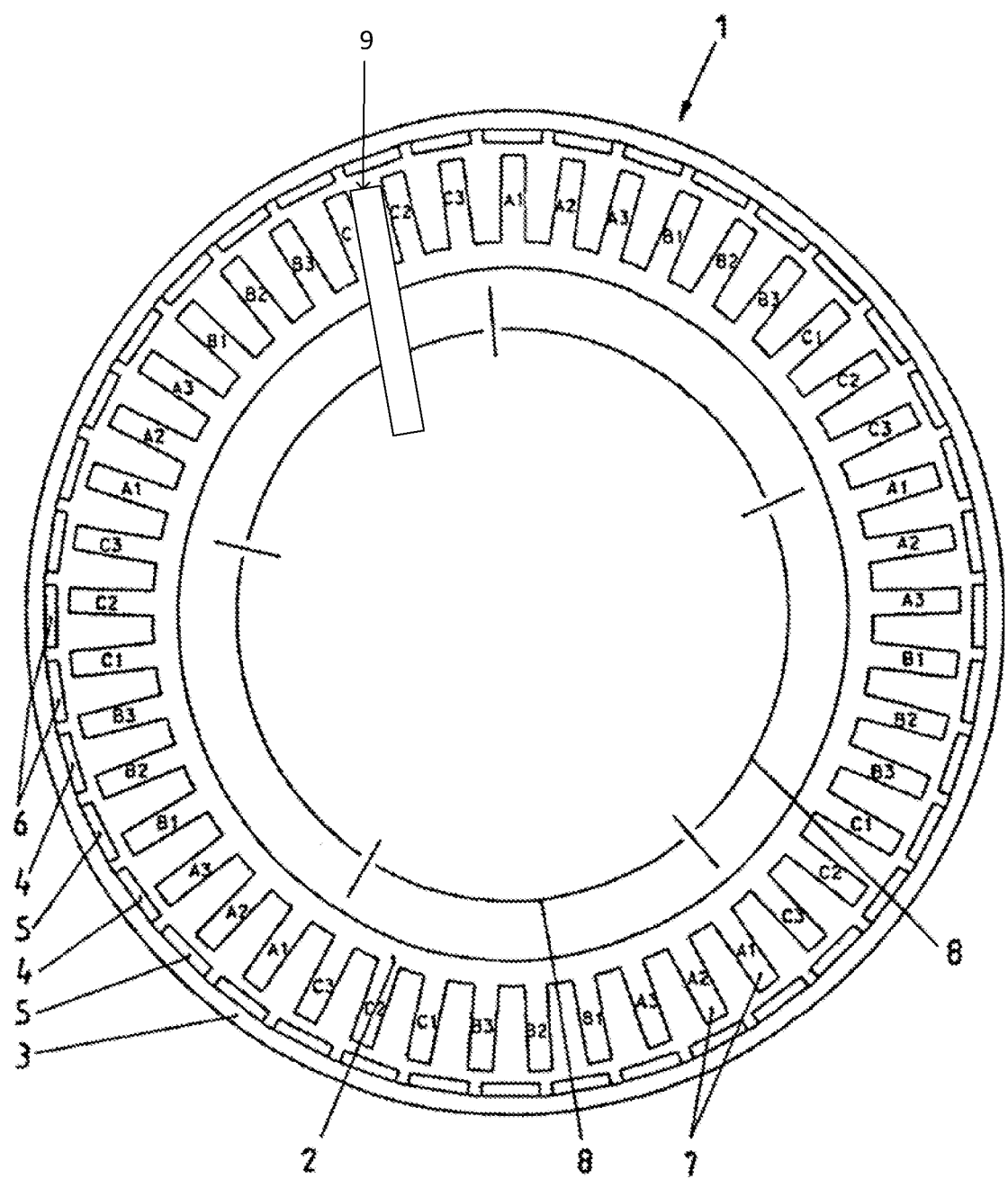
FIG. 8 is a schematic side view of an electric motor useful in a trailer assembly according to the invention.

Hence, the present invention may make use of a particular type of electrical motor illustrated in FIG. 8, namely a brushless electric motor with a stator comprising a number of stator poles and a rotor comprising a number of rotor poles. In this type of motor, the stator comprises a number of stator poles which is not an integer multiple of a corresponding number of rotor poles, and the stator poles are subdivided into at least three magnetically and electrically identical subsets that are mounted one after the other around the angular direction of the electric motor. Preferably, the stator poles are equidistantly arranged along a stator periphery. Correspondingly, the rotor poles are preferably equidistantly arranged along a rotor periphery.

Preferably, a motor 21 of this type may be arranged to directly drive a respective wheel 22 of the trailer 20. For instance, the motor 21 can be mounted on a wheel axis and drive a wheel 22 in relation to said axis, in which case two, preferably substantially identical, motors can be mounted on either side of the axis, driving one respective wheel 22 each. In this case, it is desired that the above-described control mechanism is performed in unison for each such individually driven wheel 22. Alternatively, a motor 21 of said type can be mounted to drive a wheel axis in turn propelling two wheels 22 at the same time. Wheels 22 on more than one wheel axis may also be driven, in the corresponding manner. Hence, it is foreseen that between 1 and at least 4 motors 21 can be used with one trailer 20. Preferably, all motors 21 are controlled by, and communicate with, the same control device 110.

The use of such an electric motor 21 for propelling a trailer 20 assembly of the present type achieves a number of advantages.

Firstly, such a motor provides very low cogging of the motor, which provides for a smooth rotation of the wheel.

Secondly, this type of motor 21 can be precisely controlled, based upon a feedback algorithm taking into consideration rotation positional feedback from the motor itself, across a broad spectrum of rotation velocities and patterns. This includes the above-described control loops, but also a variety of other types of control loops that may also be implemented by the control device 110.

For instance, such a motor 21 can be used to implement a free-wheeling control program, in which neither pushing nor braking force is added to the vehicle 10 but the trailer 20 simply rolls along as would a non-motorised trailer. In many situations, it may be desirable to be able to simply activate such a free-wheeling control program, for instance when the battery 23 is depleted or when a user of the trailer 20 wishes to manually manoeuvre a vehicle 10 with an attached trailer arrangement 200. Hence, the control device 110 may be arranged to activate such a free-wheeling program when certain prerequisites are detected, including a manual activation by a user.

Thirdly, a motor 21 of this type allows being used as an efficient generator for motor braking the trailer 20 while recharging the battery 23 using the generated current.

At the same time, there are many types of electrical motors that are as such in general suitable for use in a trailer arrangement 200 of the present type, such as a conventional stepping motor or a conventional brushless motor of any other type. The present inventors have discovered that, in contrast thereto, a motor 21 of said specific type is particularly well-suited for the various trailer functionality described herein, and provides a very simple yet robust construction with a minimum of movable parts and wear details.

Figure 2:
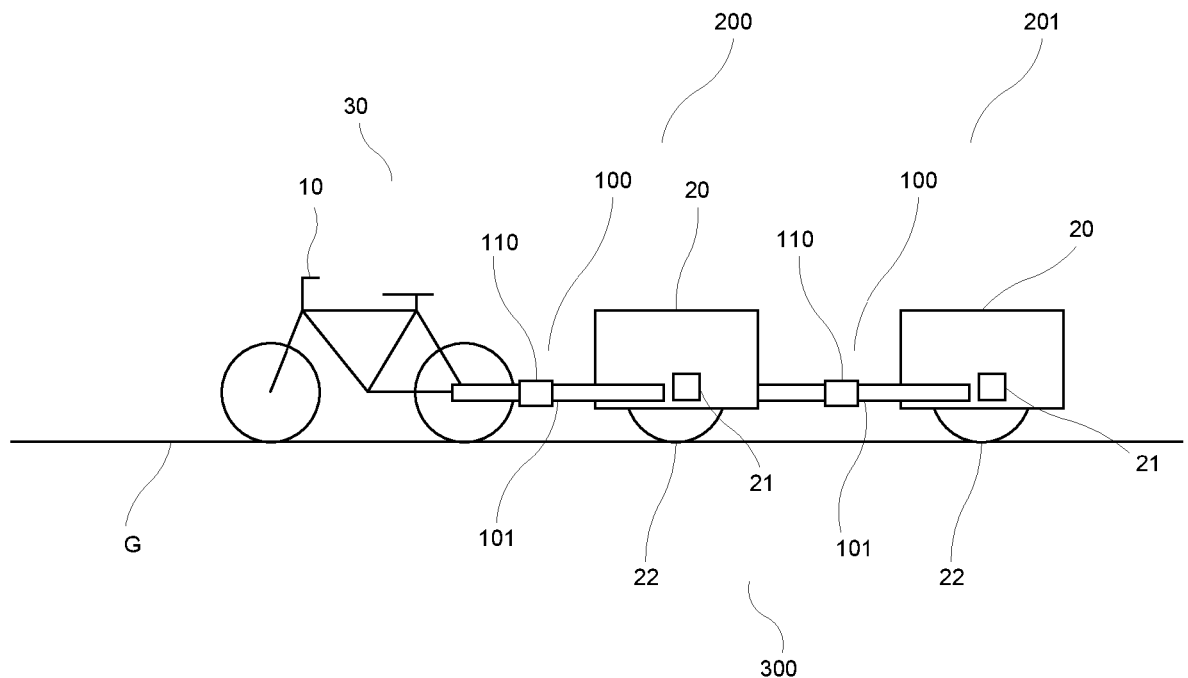
FIG. 2 shows a train of trailer arrangements according to the present invention.

A motor of the above described type is, as such, known from EP 0996217 B1, which is specifically referred to herein for information pertaining to the motor as such. FIG. 2 of EP 0996217 B1, which is also shown, in an edited version, as FIG. 8 of the present application, schematically illustrates such a motor 1, having a stator 2 and a rotor 3. In FIG. 8, the rotor 3 surrounds the stator 2, it is however realized that the situation can also be the reversed.

The stator 2 is arranged with stator poles 7, and the rotor 3 is arranged with rotor poles 6. Between the poles 6, 7, there is a gap, such as an air gap, so that the poles 6, 7 do not physically come into contact with each other. This allows the motor 1 to turn substantially without friction.

The rotor poles 7 are divided into pairs of alternate south pole 4 and north pole 5 rotor poles, preferably in the form of permanent magnets.

The motor is preferably arranged to be fed with an alternating current, either using a motor-internal AC/DC converter or using such a converter arranged as a part of, or an external part controlled by, the control device (see below). In the exemplifying case shown in FIG. 8, the motor is a three-phase AC motor.

More precisely, the stator poles 7 are fed, by said AC/DC converter (which may comprise phase-shifting circuitry), with DC voltage according to the following:

| Pole reference | Phase |
|---|---|
| A1, A3 | 0° |
| A2 | 180° |
| B1, B3 | 120° |
| B2 | 300° |

-continued

| Pole reference | Phase |
|---|---|
| C1, C3 | 240° |
| C2 | 60° |

In general, in the document EP 0291219 A1, to which specific reference is made herein regarding the details of the pole arrangement and power feeding to the poles of the motor 1, it is described how to select such phase values, the number of stator poles 7 and the number of rotor poles 6.

All poles with the same reference (A1, A3, A2, etc.) can be connected in series or, preferably, in parallel.

What is important for the present purposes is that the stator 2 comprises a number of stator poles 7 (in the present case 45 poles 7) which is not an integer multiple of a corresponding number of rotor poles 6 (in the present case 40 poles 6), and that the stator poles 7 are subdivided into at least three magnetically and electrically identical subsets 8, or coherent zones, that are mounted one after the other around the angular direction of the motor 1. This can also be expressed so that the stator 2 is arranged with a five-fold rotation symmetry with respect to its poles 7. In FIG. 8, the subsets 8 are five of number, but it is realized that they can be more or fewer, as long as they are at least three.

The combination of using such different numbers of poles 6, 7, with arranging the stator poles 7 in such subsets 8, provides for low cogging in the motor 1 while supporting all the desired features of such a motor for the present purposes in a way which has proven very advantageous in practical tests by the inventors, especially in terms of efficiency, smoothness, noise levels and exactness.

Furthermore, the motor 1 supports using a hall position sensor 9, schematically illustrated in FIG. 8. The position sensor 9 may be arranged to sense the rotation position of the motor, or comprise logic so as to provide a value for the current rotation velocity directly.

According to a preferred embodiment, the position or velocity sensor 9 is a hall effect sensor, arranged to provide the control device 110 with rotary motor position or velocity information.

Above, preferred embodiments have been described. However, it is apparent to the skilled person that many modifications can be made to the disclosed embodiments without departing from the basic idea of the invention.

For instance, the tow bar arrangement 100 described herein may be arranged to control the motor 21 of the trailer 20 in even more complex ways than described herein, as long as the described principles are employed. For instance, the control programs implemented by the control device 110 may take into consideration parameters set as a part of a user profile, or may be dynamically updated based on parametric data characterising a currently employed vehicle 10 driving style or pattern.

Similarly, the trailer 20 itself may comprise many additional details and parts, in addition to the ones described herein.

Hence, the invention is not limited to the described embodiments, but can be varied within the scope of the enclosed claims.

The invention claimed is:

1. A tow bar arrangement for interconnection of a vehicle and a trailer for pulling the trailer by the vehicle, wherein the tow bar arrangement comprises a control device in turn comprising a force sensor arranged to sense an instantaneous pulling or pushing force with respect to the vehicle in relation to the trailer, wherein the control device is arranged to read said instantaneous force from said force sensor and to produce a control signal for an electric motor arranged to propel the trailer so that a force developed by said motor counteracts said measured force, wherein the control device is arranged to measure said measured force to produce a first time series, of force measurement values, wherein the control device comprises a low-pass filter arranged to filter a force time series produced based on said first time series as well as upon a desired force value $F_d$ to produce a second time series, of low-pass filtered force measurement values, said low-pass filter being a FIR (Finite Impulse Response) filter designed with a cut-off frequency being between 25% and 75% horizontal resonance frequency of a system comprising the trailer, the tow bar arrangement and an interconnected vehicle, the control device truncating the first time series so that the FIR filter only uses between 1-10 s and/or at the most 200 samples of said first time series, the FIR filter furthermore being time shifted at least 50% of this truncation, and wherein the control device furthermore comprises a digital PI or PID regulator, arranged to produce said control signal based on said second time series.

2. The tow bar arrangement according to claim 1, wherein the control device is arranged to produce said control signal so that the motor counteracts said measured force to between 80% and 98% as long as the motor is capable of producing sufficient power.

3. The tow bar arrangement according to claim 1, control device further comprises a velocity sensor and a trailer inclination sensor, wherein the control device is arranged to measure, using said velocity sensor, an instantaneous velocity of the trailer and/or of the vehicle, and to measure, using said trailer inclination sensor, an instantaneous inclination of the trailer, wherein in that the control device is arranged to produce said control signal according to a first control program in case said measured instantaneous velocity is non-zero and below a predetermined velocity threshold value and said measured instantaneous inclination in relation to the horizontal is simultaneously above a predetermined inclination threshold value, and wherein the control device is arranged to produce said control signal according to a second or further control program in case said measured instantaneous velocity is not below said predetermined velocity threshold value or said measured instantaneous inclination in relation to the horizontal is not above said predetermined inclination threshold value.

4. The tow bar arrangement according to claim 3, wherein, in said first control program, said control device is arranged to produce said control signal so that the motor is operated either at a predetermined power or at a power which is dependent on said measured instantaneous inclination in relation to the horizontal.

5. The tow bar arrangement according to claim 3, in said first control program, the control device is arranged not to apply said low-pass filter, while, in said second or further control program, the control device is arranged to apply said low-pass filter.

6. The tow bar arrangement according to claim 3, wherein the control device, while in said second or further control program, is arranged not to activate said first control program until said measured instantaneous velocity has been measured to be non-zero and below said predetermined velocity and said measured instantaneous inclination in relation to the horizontal has been measured to simultaneously be above said predetermined inclination across a predetermined trailer rolling distance or a predetermined trailer wheel rolling angle.

7. The tow bar arrangement according to claim 6, wherein the control device, while in said second or further control program, is arranged not to activate said first control program if said predetermined trailer rolling distance or predetermined trailer wheel rolling angle takes more than a predetermined amount of time to be achieved.

8. The tow bar arrangement according to claim 3, wherein the control device, while in said first control program, is arranged to immediately activate said second or further control program in case a decrease of said measured force is detected, which decrease exceeds a predetermined threshold value.

9. The tow bar arrangement according to claim 1, wherein said control signal is arranged to control a torque applied by said electric motor, as opposed to a speed of the motor or of the trailer.

10. The tow bar arrangement according to claim 1, wherein the control device is arranged to receive a measured instantaneous speed of the motor and/or of the trailer, and to feed this value into the regulator as an input value.

11. The tow bar arrangement according to claim 1, wherein the tow bar arrangement comprises a resilient suspension, arranged to absorb small horizontal movements of the trailer in relation to an interconnected vehicle.

12. The tow bar arrangement according to claim 11, wherein the resilient suspension is spring-loaded both in a forward and a backward direction of the trailer in relation to an interconnected vehicle.

13. The tow bar arrangement according to claim 11, wherein said force sensor is arranged to sense said pulling force at the resilient suspension.

14. The tow bar arrangement according to claim 1, wherein said control device is arranged to produce said control signal as a braking or electricity generation signal in case the measured force is a pushing force.

15. The tow bar arrangement according to claim 1, wherein the force sensor is a strain gauge sensor, an impedance force sensor, a HALL sensor or a magnetoelastic sensor.

16. The tow bar arrangement according to claim 1, wherein the tow bar arrangement comprises a hub connection arranged to be releasably fastened to the back hub of a bicycle.

17. The tow bar arrangement according to claim 1, wherein the tow bar arrangement comprises a trailer connection arranged to be releasably fastened to a supporting structure of the trailer.

18. A trailer arrangement comprising a tow bar arrangement according to claim 1 and also a trailer, wherein the trailer in turn comprises said electric motor arranged to propel the trailer and a battery arranged to power the electric motor.

19. The trailer arrangement according to claim 18, wherein the trailer arrangement is arranged to be connected, by said tow bar arrangement, to a second trailer arrangement of the same type, forming a train of trailer arrangements interconnected by said tow bar arrangement.

20. The trailer arrangement according to claim 18, wherein the trailer arrangement is arranged to control said electric motor based on said control signal, so that the electric motor exerts a force which instantaneously counteracts said measured force.

21. The trailer arrangement according to claim 18, wherein said electric motor is arranged to be operated as an electric generator feeding the battery with generated electric energy, and wherein the trailer arrangement is arranged to control the electric motor to be operated as an electric generator in response to a control signal reflecting a measurement pushing force.

22. The trailer arrangement according to claim 18, wherein said electric motor is of a type in which the stator comprises a number of stator poles which is not an integer multiple of a corresponding number of rotor poles and in which the stator poles are subdivided into at least three magnetically and electrically identical subsets that are mounted one after the other around the angular direction of the electric motor.

* * * * *

UNITED STATES PATENT AND TRADEMARK OFFICE
CERTIFICATE OF CORRECTION

| | | |
|---|---|---|
| PATENT NO. | : 12,065,042 B2 | |
| APPLICATION NO. | : 17/793838 | |
| DATED | : August 20, 2024 | |
| INVENTOR(S) | : Andersson et al. | |

It is certified that error appears in the above-identified patent and that said Letters Patent is hereby corrected as shown below:

In the Claims

In Column 15, Claim 1, Line 14, delete "$F_d$" and insert --$F_d[t]$--, therefor.

In Column 15, Claim 1, Line 18, delete "horizontal" and insert --of a horizontal--, therefor.

In Column 15, Claim 3, Line 41, after "wherein" delete "in that".

Signed and Sealed this
Twenty-ninth Day of October, 2024

*Katherine Kelly Vidal*

Katherine Kelly Vidal
*Director of the United States Patent and Trademark Office*